United States Patent [19]

Shaw

[11] Patent Number: 4,802,089

[45] Date of Patent: Jan. 31, 1989

[54] STATUS FLAG HANDLING IN A DIGITAL DATA PROCESSING SYSTEM

[75] Inventor: Craig D. Shaw, Austin, Tex.

[73] Assignee: Motorola, Inc., Schaumburg, Ill.

[21] Appl. No.: 890,269

[22] Filed: Jul. 29, 1986

[51] Int. Cl.[4] .................... G06F 11/30; H03K 17/56
[52] U.S. Cl. ................................ 364/200; 307/247.1
[58] Field of Search ... 364/200 MS File, 900 MS File; 307/246, 247.1, 470

[56] References Cited

U.S. PATENT DOCUMENTS 3,979,732 9/1976 Hepworth et al. ................. 364/200

Primary Examiner—Thomas M. Heckler
Assistant Examiner—Rebecca L. Adams
Attorney, Agent, or Firm—John A. Fisher; Jeffrey Van Myers; Jonathan P. Meyer

[57] ABSTRACT

Status flag handling method and apparatus for use in a digital data processing system provide error-resistant operation and simplicity. Two storage elements comprising one bit of a status register are operated such that: a reset places both elements in first predetermined states; a set flag operation places both elements in second predetermined states; a read flag operation alters the state of the second storage element; and a clear flag alters the state of the first storage element if and only if the state of the second storage element has previously been altered by a read flag operation. The flag output corresponds to the state of the first storage element. When implemented with single instructions, inadvertant flag negation and errors due to intervening interrupts are avoided. The read flag operation temporarily disables the set flag mechanism, protecting against setting the flag during a read operation. The flag is always read as asserted prior to being negated.

15 Claims, 3 Drawing Sheets

STATUS FLAG HANDLING IN A DIGITAL DATA PROCESSING SYSTEM

FIELD OF THE INVENTION

The present invention relates, in general, to the handling (i.e., storing, setting and clearing) of status flags in digital data processing systems. More particularly, the invention relates to a method and apparatus for status flag handling in digital data processing systems which provide improved immunity to errors and simplicity of software.

BACKGROUND OF THE INVENTION

The terms "assert", "assertion", "negate" and "negation" will be used to avoid confusion when dealing with a mixture of "active high" and "active low" signals. "Assert" and "assertion" are used to indicate that a signal is rendered active, or true. "Negate" and "negation" are used to indicate that a signal is rendered inactive, or false. In some instances, in order to accomodate standard usage, "set" or "setting" may be used in the place of "assert" or "assertion" and "clear" or "clearing" may be used in the place of "negate" or "negation".

In a digital data processing system, a status flag is a single bit of data which is stored in a status register. The processing system sets a status flag to indicate a current condition of the processing system, a result of some previously executed operation or some other factor which must be acted upon or taken into account when taking subsequent action. An example is a timer overflow flag which is set by the processing system when a counter containing a timer value overflows.

A particular status flag may be stored as one bit in a register which contains other status flags and perhaps other similar data values such as function control bits. Once the status flag has been set, it is read and cleared under control of the user through software. It is desireable that any scheme for the handling of status flags have the following characteristics, among others: (1) the scheme should protect against the inadvertant alteration of other bits in the status register when a particular status flag is read or cleared; (2) the scheme should protect against errors caused by interrupts which occur during status flag operations; (3) the scheme should protect against the clearing of a status flag prior to its being read in its asserted state; (4) the scheme should protect against the setting of a status flag while it is being read; and (5) the scheme should provide simplicity in the commands used for status flag handling and in their usage.

A common prior art status flag handling scheme involves a read-modify-write sequence when clearing a status flag. The status register is loaded into an accumulator (read), the contents of the accumulator are operated on to negate the bit corresponding to the status flag being cleared (modify) and the modified contents of the accumulator are stored back into the status register (write). This scheme is subject to inadvertant alteration of other bits in the status register, to errors caused by intervening interrupts and is not particularly efficient in terms of the code required to clear a status flag.

Suppose, for instance, that a timer overflows while the contents of the status register are being modified in the accumulator. The processing system will set the timer overflow flag bit in the status register, but the corresponding bit in the accumulator will not be changed. The subsequent transfer from the accumulator to the status register may inadvertantly clear the timer overflow flag. Similarly, interrupts which occur while a status flag is being cleared may cause the alteration of other status flags or function control bits in the status register, resulting in an error when the accumulator is stored back to the status register. Finally, the requirement of three instructions to clear one flag is not particularly efficient.

It is possible, by the use of additional instructions, to generate a read-modify-write technique which safeguards against inadvertant status flags clearing. However, intervening interrupts are still a source of errors and the code is rendered even less efficient. Other status flag handling schemes are known, but none are known which adequately satisfies each of the criteria set forth above.

SUMMARY OF THE INVENTION

Accordingly, it is an object of the present invention to provide an improved method and apparatus for status flag handling in a digital data processing system.

Another object of the present invention is to provide an improved method and apparatus for status flag handling in a digital data processing system which are not subject to inadvertant alteration of other bits in the status register or to upset caused by intervening interrupts.

Yet a further object of the present invention is to provide an improved method and apparatus for status flag handling in a digital data processing system which assure that a status flag is not cleared prior to being read in its asserted state.

Still a further object of the present invention is to provide an improved method and apparatus for status flag handling in a digital data processing system which protect against the setting of a status flag while it is being read.

These and other objects and advantages of the present invention are provided by a method of operating an apparatus comprising first and second storage elements, each having at least a first and a second stable state comprising the steps of: uninterruptibly forcing each of said storage elements into one of its stable states in response to a SET FLAG control signal; uninterruptibly altering the state of the second storage element and disabling the response to the SET FLAG control signal in response to a READ FLAG control signal; and uninterruptibly altering the state of the first storage element in response to a CLEAR FLAG control signal if and only if the state of the second storage element has been previously altered in response to the READ FLAG control signal.

These and other objects and advantages of the present invention will be apparent to one skilled in the art from the detailed description below taken together with the drawings.

DETAILED DESCRIPTION OF THE INVENTION

Figure 1:
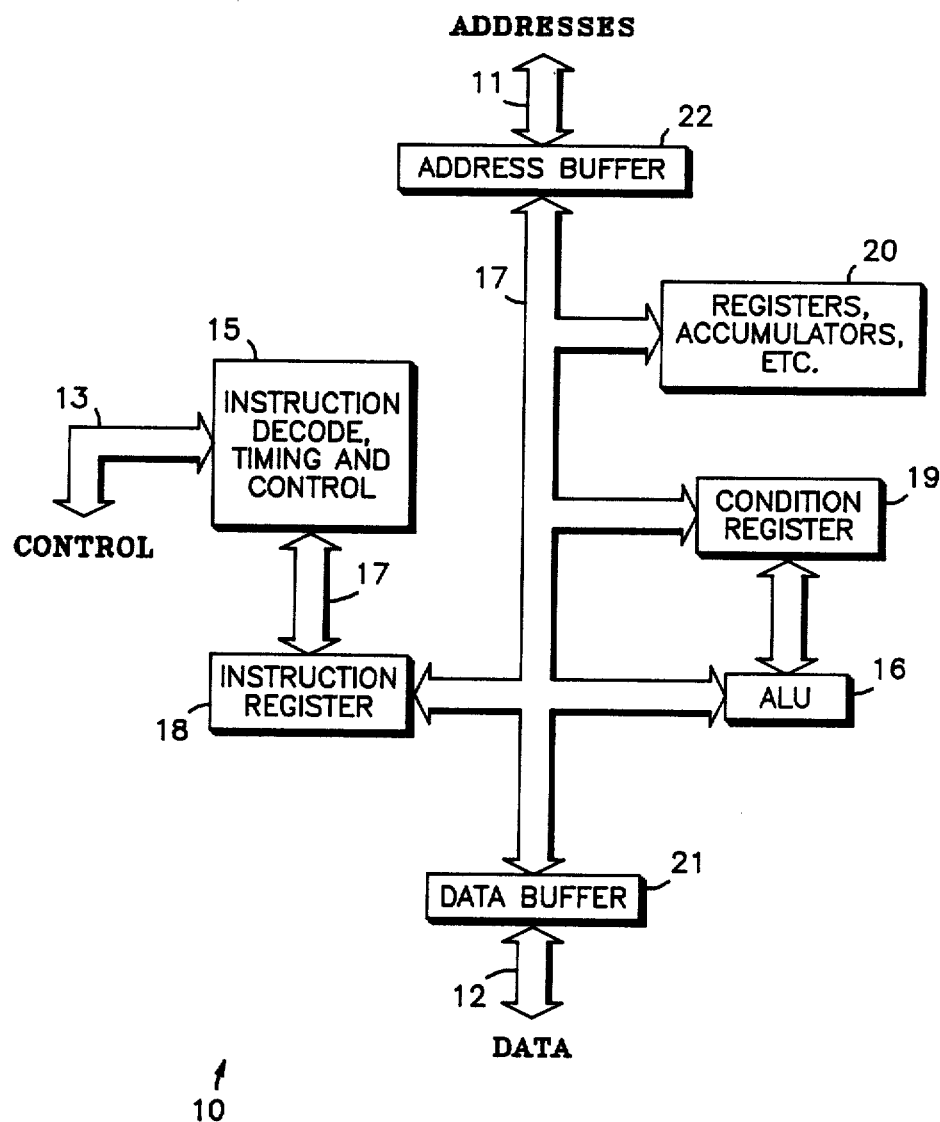
FIG. 1 is a block diagram illustrating the major components and interconnections therebetween of a typical digital data processing system.

The major functional components and interconnections therebetween of a fairly typical digital data processing system 10 are illustrated in FIG. 1. Since the components and interconnections are subject to wide variations at the discretion of the system designer, FIG. 1 is intended to be illustrative only. In addition, while the system shown is typical of a central processing unit (CPU), the present invention could easily be implemented in other digital data processing environments, such as peripherals, controllers and the like.

Processing system 10 has three major paths for interconnection to the outside world: an address bus 11, a data bus 12 and a control bus 13. The design and use of such busses are well known in the art. An instruction decode, timing and control block 15 is coupled to control bus 13 and receives control signals such as interrupts, clock signals and the like therefrom. In addition, block 15 is coupled to an instruction register 18 via an internal bus 17. Instructions are received by block 15 via register 18 and decoded. As is familiar in the art, this decoding may be done in hardware or by a microcoded system in which each instruction refers to one or more micro-instructions which are typically stored in a non-volatile memory. Block 15 then provides control and timing signals to the other components of processing system 10 via control connections which are eliminated here for purposes of clarity.

The other major components of processing system 10, all of which are coupled to internal bus 17, are an arithmetic and logic unit (ALU) 16, a condition register 19 and various other registers, accumulators and other devices 20. The design and operation of each of these components, and of processing system 10, are widely known in the art and will not be described in further detail herein. Typically, one or more of the registers shown as block 20 in FIG. 1 are used as status registers and contain status flags, function control bits and perhaps other similar data values. The remainder of this description deals with the design and operation of such a register.

Figure 2:
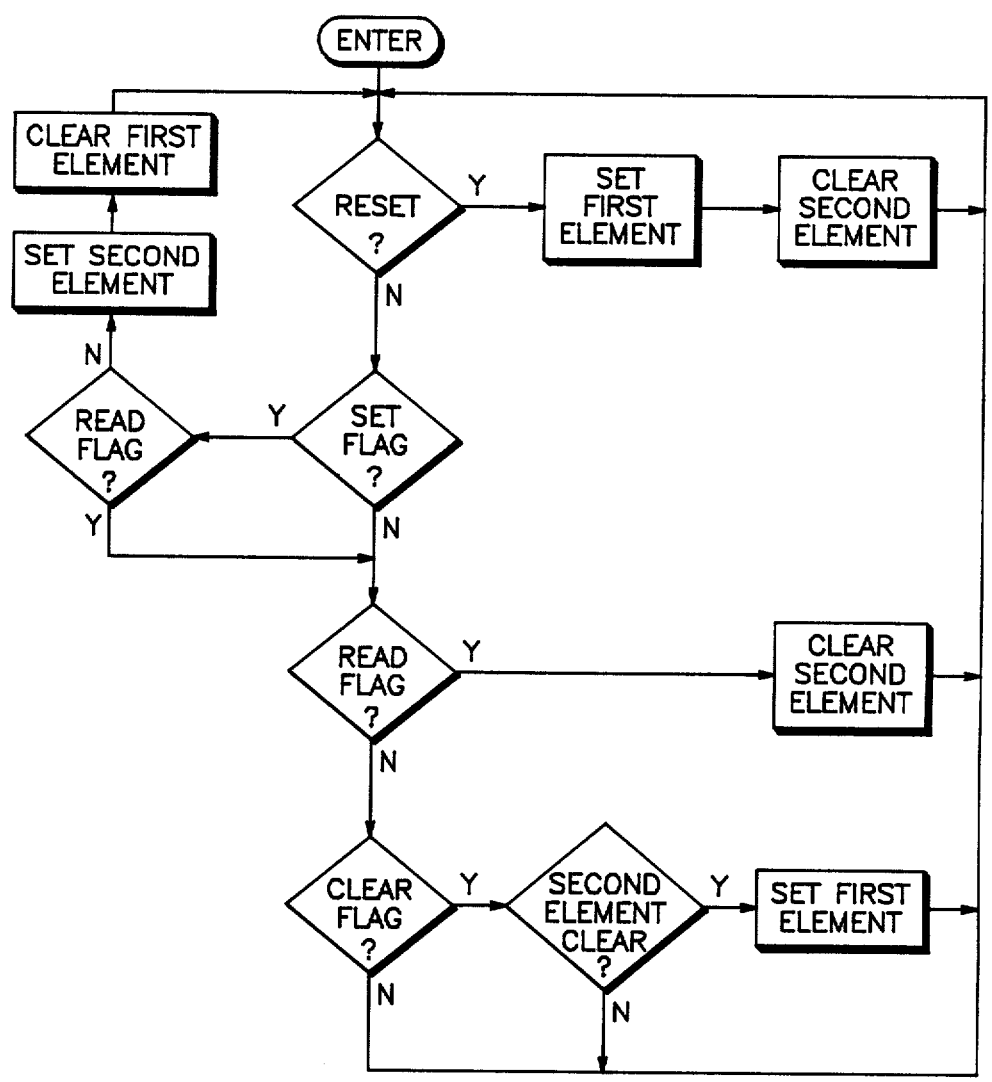
FIG. 2 is a flow chart illustrating a method of status flag handling according to the principles of the present invention.

FIG. 2 is a flow chart illustrating a method of operating an apparatus comprising first and second storage elements, each having at least first and second stable states, which method embodies the principles of the present invention. The apparatus being operated stores, sets and clears one bit which corresponds to a status flag. The value of the status flag in this particular embodiment corresponds to the inverse of the state of the first storage element.

The method of operating described with reference to FIG. 2 is responsive to four control signals: RESET, SET FLAG, READ FLAG and CLEAR FLAG. Therefore, the flow chart comprises four tests, one to determine whether each of the control signals has been asserted. In each case, if the control signal is not asserted, processing continues with the next test.

As is the case with most status registers, this apparatus is responsive to a RESET control signal to return to a known state. In this particular embodiment of the invention, if the RESET control signal is asserted, the first storage element is set and the second storage element is cleared. Thus, the flag will read as clear following a RESET.

If the SET FLAG control signal is asserted, the READ FLAG control signal is tested. If the READ FLAG control signal is asserted simultaneously with the SET FLAG signal, the SET FLAG operation is aborted and processing continues with the next major test. This provides protection from a flag being set while it is being read. If the READ FLAG control signal is not asserted, then the second stoarge element is set and the first storage element is cleared. The flag will now read as set.

If the READ FLAG control signal is asserted, the second storage element is cleared. No other action is taken. It is assumed that some logic external to the apparatus will latch the flag value for the data bus.

If the CLEAR FLAG control signal is asserted a test of the state of the second storage element is performed. If, and only if, the second element is clear, indicating that the flag has been read since being set, then the first first storage element is set, thus placing the apparatus back into its condition following a RESET.

A method of status flag handling according to the flow chart of FIG. 2 exhibits all of the desireable characteristics mentioned above if implemented in an uninterruptible fashion. In many digital data processing systems, which have at least some non-maskable interrupts, this means that various functions, in particular the clear flag function, must be performed in response to a single instruction. The designer may chose to use a micro-programmed or a hard-wired approach to implement the necessary instructions as may be appropriate.

Figure 3:
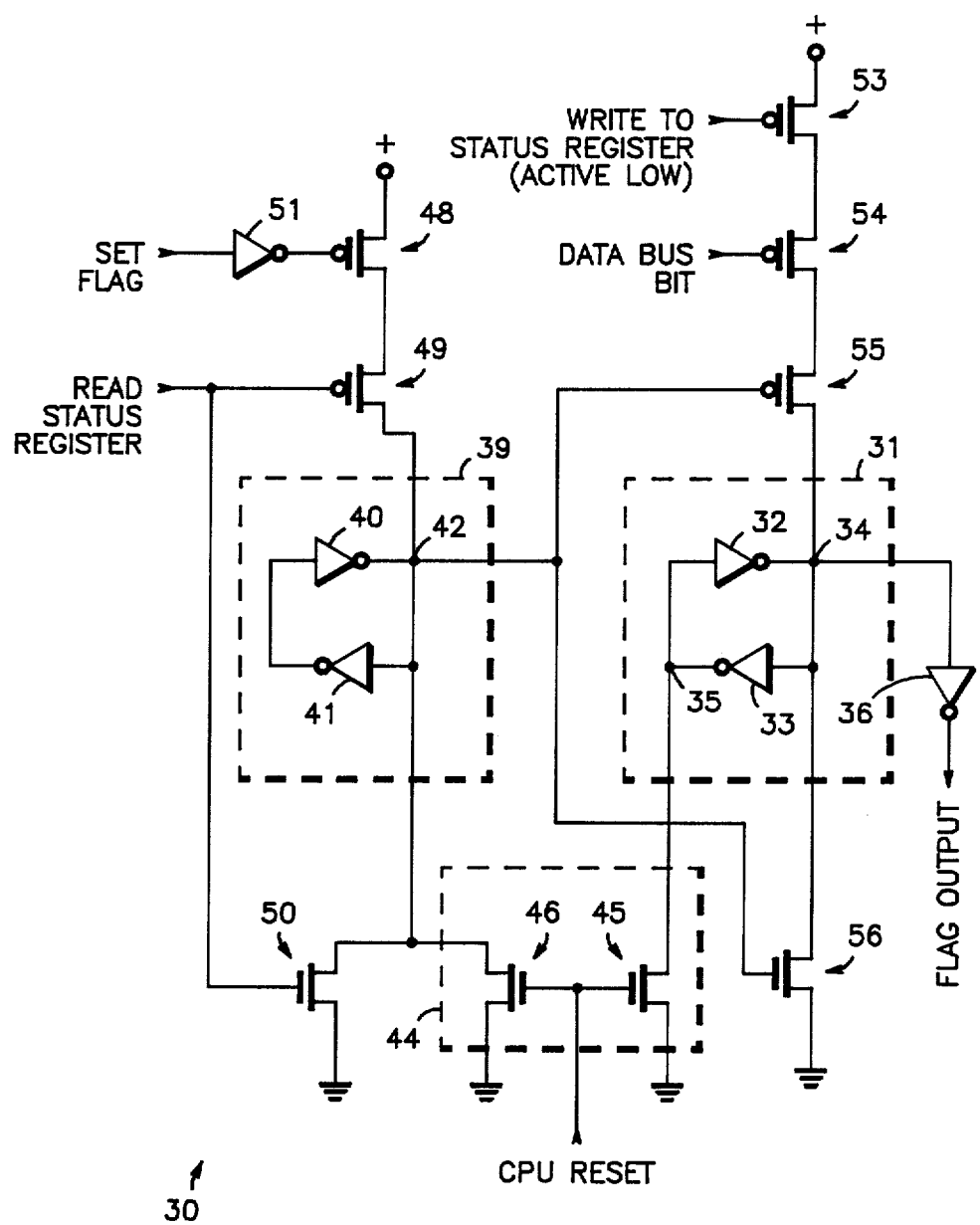
FIG. 3 is a schematic diagram illustrating an apparatus embodying the principles of the present invention.

FIG. 3 is a schematic diagram of an apparatus embodying the principles of the present invention. Apparatus 30 provides means to store, set, read and clear one bit of information and may be used, together with other identical cicuits, to form a status register. Apparatus 30 is capable of being operated according to the method of the present invention. In the following description, field effect transistors (FET's) are described as having source and drain electrodes connected in a particular fashion. One skilled in the art will appreciate that such devices are non-directional and that the functions of the source and drain electrodes may be interchanged at will. The particular choice of which electrode to refer to as "source" and "drain" is made according to an arbitrary convention.

A first latch (the first storage element) 31 comprises a first inverter 32 and a second inverter 33 coupled input-to-output in the familiar latch arrangement. For present purposes, the important feature of latch 31 is that it can be placed in one of two logic states and that it will retain that state until changed. A first node 34 of latch 31 corresponds to the output of inverter 32 and the input of inverter 33. A second node 35 of latch 31 corresponds to the output of inverter 33 and the input of inverter 32. The data value appearing at node 34 of latch 31 is the inverse of the status flag value. A third inverter 36 having an input coupled to node 34 of latch 31 provides the correct data value to the FLAG OUTPUT node of apparatus 30.

A second latch (the second storage element) 39 comprises a fourth inverter 40 and a fifth inverter 41 coupled in the familiar input-to-output latch arrangement. A node 42 of latch 39 corresponds to the output of inverter 40 and the input of inverter 41.

A clear-on-reset apparatus 44 comprises a first N-channel FET 45 and a second N-channel FET 46. The gates of FET's 45 and 46 are coupled to a CPU RESET control line so that FET's 45 and 46 are conductive when a CPU RESET signal is active, or high. The sources of FET's 45 and 46 are coupled to ground. The drain of first FET 45 is coupled to second node 35 of first latch 31. The drain of second FET 46 is coupled to node 42 of second latch 39.

A first P-channel FET 48 has a source coupled to a positive power supply and a drain coupled to a source of a second P-channel FET 49. A drain of second P-channel FET 49 is coupled to node 42 of second latch 39. A third N-channel FET 50 has a source coupled to ground and a drain coupled to node 42 of second latch 39. A gate of FET 48 is coupled to an output of an inverter 51, whose input is coupled to a SET FLAG node of apparatus 30. A gate of FET 49 is coupled to a READ STATUS REGISTER node of apparatus 30, as is a gate of FET 50.

A third P-channel FET 53 has a source coupled to a positive power supply and a drain coupled to a source of a fourth P-channel FET 54. Fourth P-channel FET 54 has a drain coupled to a source of fifth P-channel FET 55, which has a drain coupled to first node 34 of first latch 31. A fourth N-channel FET 56 has a source coupled to ground and a drain coupled to first node 34 of first latch 31. A gate of FET 53 is coupled to a WRITE TO STATUS REGISTER node of apparatus 30. The WRITE TO STATUS REGISTER signal which is input to this node is active low. A gate of FET 54 is coupled to a DATA BUS BIT node of apparatus 30 which has a data bus signal corresponding to that bit of the data bus on which the status flag is carried input thereto. A gate of FET 55 is coupled to node 42 of second latch 39, as is a gate of FET 56.

When the digital data processing system of which apparatus 30 is a part is reset, the CPU RESET signal is asserted, thus causing FET's 45 and 46 to be conductive. This causes second node 35 of first latch 31 to be forced to a negated logic state and first node 34 to be forced to an asserted logic state. Since the FLAG OUTPUT node is always the inverse of node 34, FLAG OUTPUT will read as negated following a CPU RESET and will remain in that state until changed. Similarly, node 42 of second latch 39 is forced to a negated logic state on a CPU RESET and will remain in that state until changed.

All logic signals in the described apparatus are active high except the WRITE TO STATUS REGISTER signal, and all are normally inactive. Therefore, following a CPU reset, FET's 48 and 50 are non-conductive, isolating second latch 39 from alteration. In addition, FET's 53 and 56 are non-conductive, isolating first latch 31 from alteration. FET's 49 and 55 are conductive, but have no effect on latches 31 and 39. The state of FET 54 varies depending on events on the corresponding bit of the data bus.

When the SET FLAG input is asserted, the output of inverter 51 is negated, thus rendering FET 48 conductive. If the READ STATUS REGISTER signal is currently negated, then FET 49 will also be conductive and node 42 of latch 39 will be forced to an asserted logic state, which will be held until altered. This renders FET 56 conductive, grounding node 34 of latch 31 and negating it. This, of course, forces the FLAG OUTPUT of apparatus 30 to be asserted. Any routine reading this bit of the status register will now see that the bit is set, or high.

Apparatus 30 protects against errors caused by coincident set and read operations. If the READ STATUS REGISTER signal is asserted, FET 49 is non-conductive, thus blocking any SET FLAG signal from altering the logic value of node 42. In addition, no write operation can negate, or clear, the apparatus until the flag has been read at least once since being set. Once set, the high value on node 42 renders FET 55 non-conductive, preventing the positive power supply from altering the low logic value of node 34. In addition, FET 56 remains conductive, thus re-inforcing the low logic state of node 34 of latch 31. However, when the READ STATUS REGISTER signal is asserted, FET 50 is rendered conductive, thus forcing a high-to-low transition of node 42 of latch 39. This simultaneously renders FET 56 non-conductive and FET 55 conductive. Note that the state of node 34 is not immediately altered, it is merely rendered vulnerable to alteration by the next high-to-low transition of the WRITE TO STATUS REGISTER signal.

After one or more occurences of an active READ STATUS REGISTER signal, a status flag clear operation is performed. This involves bringing the WRITE TO STATUS REGISTER signal low, or active, thus rendering FET 53 conductive. In addition, a low value is placed on the processing system's DATA BUS BIT line corresponding to the status flag, which renders FET 54 conductive. Since FET 55 is already conductive, this forces a low-to-high transition of node 34 of latch 31. This will render the FLAG OUTPUT node of apparatus 30 low, or inactive. Thus apparatus 30 is placed back into the condition it was in following a CPU RESET.

The apparatus of FIG. 3 may be advantageously implemented in a microprogrammed digital data processing system which uses single instructions to perform the set flag and clear flag functions. Consider, for example, a processing system in which a register referred to as REG1 is eight bits wide. Bits 0–3, the four least significant bits, contain function control bits 1–4, respectively. Bits 4–7, the four most significant bits, contain status flags 4–1, respectively. An instruction BSET %01000000 REG1 is decoded so that the SET FLAG signal corresponding to bit 6 of REG1 is made active, thus setting status flag 2. No intervening interrupts are possible, since this is a single instruction.

A similar single instruction, BCLR %01000000 REG1, would clear status flag 2 by bringing the WRITE TO STATUS REGISTER signal and bit 6 of the data bus low. Obviously, the status flag would not be cleared if it had not been previously read in its set state. Once again, no intervening interrupts are possible.

As will be apparent to one skilled in the art, in some situations, a particular status flag will only be set by the processing system hardware and it will not be necessary to provide a means for setting that flag through software. it is conceivable that some processing systems will require only the BCLR instruction described above.

The design and construction of a digital data processing system which is either hard-wired or microprogrammed to implement the BSET and BCLR functions described above in an uninterruptible fashion will be familiar to one skilled in the art. In addition, modifications to the apparatus of FIG. 3 may be made as will be apparent to one skilled in the art.

The apparatus and method described provide improved status flag manipulation in a digital data processing system. Clearing, or negating, the status flag is not subject to upset caused by intervening interrupts. Inadvertant clearing of flags is avoided. Protection against flag setting during a status read operation and from flag clearing prior to a status read operation are provided.

Finally, implementation with single instructions provides for simplicity of the instruction set and of software for the processing system.

While the present invention has been described with reference to a particular embodiment thereof, various modifications and changes thereto will be apparent to one skilled in the art and are within the scope of the invention.

I claim:

1. In a digital data processing system, a method of operating an apparatus comprising first and second storage elements, each having only first and second stable states, comprising the steps of:
   uninterruptibly forcing each of the storage elements into one of its stable states in response to a set flag control signal;
   uninterruptibly altering the state of the second storage element in response to a read flag control signal;
   uninterruptibly altering the state of the first storage element in response to a clear flag control signal if and only if the state of the second storage element has previously been altered in response to the read flag control signal; and
   providing a status flag output determined solely by the state of said first storage element.

2. A method according to claim 1 further comprising the step of:
   uninterruptibly forcing each of the storage elements into one of its stable states in response to a reset control signal.

3. A method according to claim 1 wherein said step of uninterruptibly forcing each of the storage elements into one of its stable states in response to a set flag control signal further comprises the steps of:
   uninterruptibly forcing the first storage element into its first stable state; and
   uninterruptibly forcing the second storage element into its second stable state.

4. A method according to claim 3 wherein said step of uninterruptibly altering the state of the second storage element in response to a read flag control signal further comprises the step of:
   uninterruptibly forcing the second storage element into its first stable state.

5. A method according to claim 4 wherein said step of uninterruptibly altering the state of the first storage element in response to a clear flag control signal further comprises the step of:
   uninterruptibly forcing the first storage element into its first stable state.

6. A method according to claim 1 wherein said step of uninterruptibly altering the state of the second storage element in response to a read flag control signal further comprises the step of:
   disabling temporarily a response to said set flag control signal.

7. In a digital data processing system including a status register having at least one bit storage location comprising first an second storage elements, each having only first and second stable states, a method of operating the digital data processing system comprising the step of:
   responding to a reset control signal by forcing said first and second storage elements into first predetermined states;
   responding to a set flag control signal by uninterruptibly forcing said first and second storage elements into second predetermined states;
   responding to a first software instruction by uninterruptibly altering the state of the second storage element;
   responding to a second software instruction by uninterruptibly altering the state of the first storage element if and only if the state of said second storage element has previously been altered by response to said first software instruction; and
   providing a status flag output determined solely by the state of said first storage element.

8. A method according to claim 7 further comprising the step of responding to a third software instruction by generating said set flag control signal.

9. A method according to claim 7 wherein said step of responding to said first software instruction further comprises the step of:
   disabling temporarily a response to said set flag control signal.

10. In a digital data processing system, an apparatus for status flag handling comprising:
    a first storage element having only first and second stable states;
    a second storage element having only first and second stable states;
    reset means for forcing said first and second storage elements into first predetermined states;
    set flag means for forcing said first and second elements into second predetermined states;
    read flag means for altering the state of said second storage element;
    clear flag means for altering the state of said first storage element if and only if the state of said second storage element has previously been altered by said read flag means; and
    output means for providing a flag output controlled solely by the state of said first storage element.

11. An apparatus according to claim 10 wherein said read flag means further comprises:
    means for temporarily disabling said set flag means.

12. An apparatus according to claim 10 wherein said reset means further comprises:
    means for forcing said first storage element into said second stable state; and
    means for forcing said second storage element into said first stable state.

13. An apparatus according to claim 12 wherein said set flag means further comprises:
    means for forcing said second storage element into said second stable state; and
    means for forcing said first storage element into said first stable state.

14. An apparatus according to claim 13 wherein said read flag means further comprises:
    means for forcing said second storage element into said first stable state; and
    means for disabling temporarily said set flag means.

15. An apparatus according to claim 14 wherein said clear flag means further comprises:
    means for forcing said first storage element into said second stable state; and
    means for disabling said means for forcing if said second storage element is in said second stable state.

* * * * *